(12) United States Patent
Lee et al.

(10) Patent No.: US 6,612,736 B2
(45) Date of Patent: Sep. 2, 2003

(54) METHOD AND APPARATUS FOR ESTIMATING VEHICLE BRAKE ROTOR TEMPERATURE

(75) Inventors: Kwangjin Michael Lee, Novi, MI (US); Qingyuan Li, Ann Arbor, MI (US); Emily Allison Clark, Mountain View, CA (US); Eric Edward Krueger, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/036,104

(22) Filed: Oct. 26, 2001

(65) Prior Publication Data

US 2003/0081650 A1 May 1, 2003

(51) Int. Cl.$^7$ .............. G01K 13/00; F16D 66/00; G06F 7/00
(52) U.S. Cl. ............ 374/153; 374/142; 188/1.11 E; 303/191; 701/29
(58) Field of Search .............. 374/153, 142, 374/141; 188/1.11 R, 1.11 L, 1.11 E; 303/160–191; 701/29, 70

(56) References Cited

U.S. PATENT DOCUMENTS

| | | | |
|---|---|---|---|
| 5,136,508 A | | 8/1992 | Bannon et al. ............ 701/70 |
| 5,482,146 A | * | 1/1996 | Estaque et al. ............ 188/164 |
| 5,524,974 A | * | 6/1996 | Fischle et al. ............ 303/191 |
| 5,596,513 A | * | 1/1997 | Schricker ............ 701/70 |
| 6,456,922 B1 | * | 9/2002 | Gamberg ............ 701/70 |
| 6,487,487 B2 | * | 11/2002 | Kesselgruber ............ 701/70 |
| 6,490,518 B1 | * | 12/2002 | Walenty et al. ............ 303/176 |
| 2001/0049577 A1 | * | 12/2001 | Kesselgruber ............ 701/70 |

OTHER PUBLICATIONS

Dubensky, R. G., "Computer techniques for predicting brake rotor performance," Spring National Design Engineering Show and Conference. Conf. Proceedings, Chicago, IL, USA, Mar. 2–5, 1987, p. 269–275 (Cahners Exposition Group, Stamford, CT, USA).*

David C. Sheridan et al, "Approaches to the Thermal Modeling of Disc Brakes," SAE Paper No. 880256, Copyright 1988 (No Month).

* cited by examiner

Primary Examiner—Diego Gutierrez
Assistant Examiner—Stanley J. Pruchnic, Jr.
(74) Attorney, Agent, or Firm—Robert M. Sigler

(57) ABSTRACT

An estimated brake rotor temperature is provided including a cooling effect during active braking as well as when braking is inactive. The cooling effect is based on a difference between the rotor temperature and sensed ambient temperature and is also preferably based on wheel speed. In an active braking mode, a heating effect is provided based at least on sensed wheel speed. If no brake pressure signal is available, the heating effect is further based on vehicle deceleration. The heating effects for front and rear brake units are relatively compensated for differences in heat generation due to load shifts during braking, the compensation being preferably based on vehicle deceleration. The brake rotor temperature estimation is realized in a programmed digital computer but does not use computer resource hungry exponential functions.

4 Claims, 2 Drawing Sheets

METHOD AND APPARATUS FOR ESTIMATING VEHICLE BRAKE ROTOR TEMPERATURE

TECHNICAL FIELD

The technical field of this invention is vehicle systems incorporating vehicle wheel brakes, and particularly such systems for determining brake rotor temperature.

BACKGROUND OF THE INVENTION

Braking performance can be significantly affected by the temperature rise in brake components such as rotors. For this reason, systems have been proposed for monitoring the temperature of brake components. For example, temperature sensors such as thermocouples have been used in brake system and/or component testing, although such sensors are not practical for mass-produced vehicle applications. In addition, brake component estimation algorithms have been proposed. Such monitoring allows the generation of a driver warning or even the automatic reduction of braking pressure of individual wheels in braking or traction control, as described in U.S. Pat. No. 5,136,508, issued Aug. 4, 1992.

But the algorithm of the aforementioned patent has shortcomings. First of all, it is a method for estimating brake lining temperature; but brake lining temperature is much less well defined than brake rotor temperature. The linings, in a brake caliper pad, for example, are made of a substance having a much lower heat conductivity (higher temperature insulating effect) and a higher wear rate than the same characteristics of a brake rotor. Corroboration of any temperature estimation algorithm requires an accurately measured temperature test using a temperature sensor such as a thermocouple. Mounted in a brake lining, such a thermocouple must be placed a significant distance away from the rotor/lining interface so that, even with lining wear, the sensor will not be contacted and compromised by the metallic, fast spinning rotor. In the low heat conductivity environment of a brake lining, the distance of the thermocouple from the rotor/lining interface will provide a large temperature insulation between the interface and the sensor that leads to inaccuracy in sensing of the interface temperature. But a metallic brake rotor has a high heat conductivity and a low wear rate, in comparison with a lining. This allows a rotor mounted, corroborating thermocouple to be placed much closer, comparatively, to the rotor/lining interface if it is incorporated in a brake rotor rather than a brake lining. It will thus provide a more accurate reading of the temperature of the rotor/lining interface during braking.

This effect is even more true in a dynamic temperature variation. As brake pressure varies and the temperature at the brake rotor/lining interface heats up and cools down, most (typically more than 95%) of the heat generated at the interface flows away through the highly conductive rotor. The temperature measured by the well insulated lining thermocouple will vary less and with much greater time delay. The temperature measured by the rotor mounted thermocouple will follow the dynamic variation of the temperature at the rotor/lining interface far better than the temperature measured by a lining mounted thermocouple. Thus, brake rotor temperature can be much more accurately defined with real time temperature measurement; and this provides a more accurate corroboration for a brake rotor temperature estimation algorithm than for a brake lining temperature algorithm. Since brake rotor temperature provides a more accurate indication of temperature at the rotor/lining interface, a temperature estimation algorithm can, and should, provide a more sophisticated, and thus more accurate, estimated value of the brake rotor temperature. For example, temperature effects due to fore and aft vehicle load shift due to braking and/or cooling effects during braking are significant and measurable.

The temperature estimation algorithm of the aforementioned patent estimates a vehicle speed dependent cooling effect on the brake lining, but only when the brakes are not being applied. In reality, the cooling effect occurs at all times; and this is especially true for a brake rotor, which radiates heat more efficiently, both because of its metal structure and because of the great portion of its surface area that is not covered by the brake pad/lining and is thus exposed directly to the air.

In addition, the algorithm of the aforementioned patent relies heavily on exponential functions, which greatly consume controller computer resources, especially memory. Thus, to be practical and accurate, a brake temperature estimation algorithm should preferably avoid the use of exponential and other memory intensive functions.

SUMMARY OF THE INVENTION

This invention is a method and apparatus for providing an estimated brake rotor temperature. It provides for a cooling effect during braking as well as when braking is inactive, the cooling effect being based on a difference between the rotor temperature and sensed ambient temperature and also preferably based on wheel speed. In an active braking mode, it provides for a heating effect based at least on sensed wheel speed. If no brake pressure signal is available, it further bases the active braking heating effect on vehicle deceleration. Preferably, it provides compensation between front and rear brake units for differences in heat generation due to load shifts during braking, the compensation being preferably based on vehicle deceleration. It also does not use computer resource hungry exponential functions in determining the estimated brake rotor temperature.

DESCRIPTION OF THE PREFERRED EMBODIMENT

Figure 1:
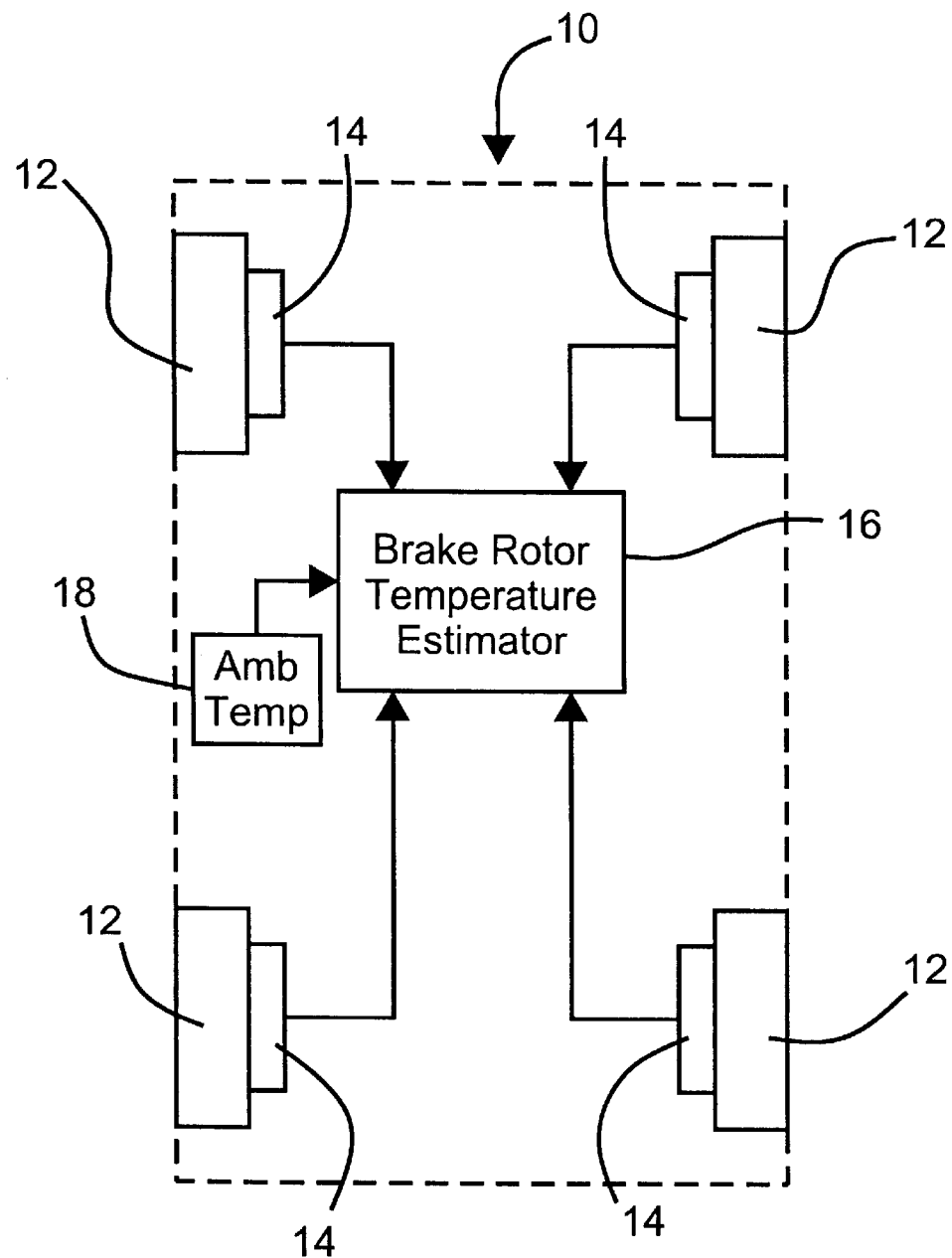
FIG. 1 is a schematic diagram of a vehicle having a brake system with a brake rotor temperature estimation apparatus according to the invention.

Referring to FIG. 1, a vehicle 10 is provided with wheels 12 and a brake system having brake units 14 associated with wheels 12. The brake units 14 are preferably disk brake actuators in which brake rotors are clamped by calipers having brake pads or linings when the caliper is activated by a hydraulic piston. The brake units may be activated from a central master cylinder but may preferably include individual anti-lock (ABS) apparatus as is well known in the art for sensing wheel slip and modulating individual wheel brake pressure to reduce excessive wheel slip. Alternatively, the brake units may include their own hydraulic pressure source in a brake by wire system, or be activated by electric or air power. Brake units 14 are preferably provided with built in wheel speed sensors, commonly used for sensing wheel slip in ABS or traction control modes of operation and capable of providing sufficient information for derivation of vehicle speed and acceleration or deceleration.

A brake rotor temperature estimator 16 is provided with the wheel speed signals from brake units 14 as well as an ambient temperature signal from ambient temperature sensor 18. Sensor 18 may most economically be such a sensor already existing on the vehicle, such as an engine intake manifold air temperature sensor or a sensor for an outside temperature display; but a separate temperature sensor such as a thermocouple on the vehicle body close to the wheel is preferred. Estimator 16 is preferably part of a brake/traction control system controller, although it could alternatively be a stand alone device. Estimator 16 preferably comprises a digital computer having a microprocessor, memory and I/O apparatus and storing a program or routine controlling the process of estimating brake rotor temperature from the input signals and outputting the estimated brake rotor temperature and passing it on to apparatus requiring it, such as, for example, a traction control program in the same computer, wherein the estimated brake rotor temperature may permit the traction control routine to reduce or cancel traction control if the brakes become overheated. The signal may additionally be used in other ways as an over-temperature indicator or warning in vehicle 10.

Figure 2:
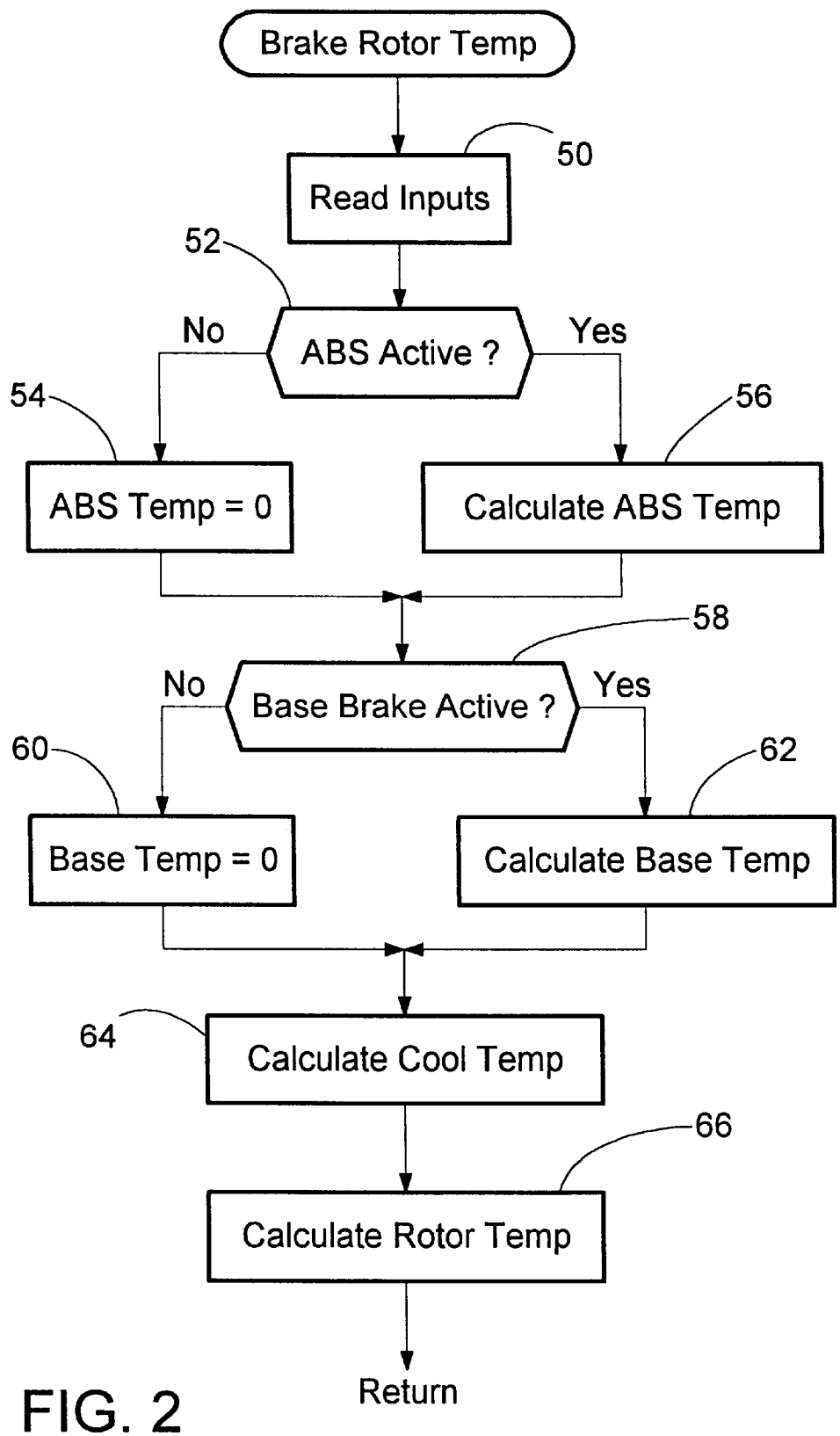
FIG. 2 is a flow chart illustrating the operation of the brake rotor temperature estimation apparatus of the brake system shown in FIG. 1.

The operation of estimator 16 is described with reference to the flow chart of FIG. 2. The routine operates individually on each brake unit of the vehicle and derives a brake rotor temperature for each brake unit independent of the other units. Routine BRAKE ROTOR TEMP starts at step 50 by reading the required inputs. These include wheel speed signals from brake units 14 and the ambient temperature signal from sensor 18. From the wheel speed signals of undriven wheels, the routine can calculate vehicle speed (the average of the signals) and vehicle deceleration (derivative of the vehicle speed). The latter can be derived simply and reasonably accurately, if loop time and sample rate are sufficiently fast, by taking the difference between consecutive vehicle speed values.

The embodiment described has two active braking modes: (1) ABS or anti-lock mode, wherein the ABS control of a wheel overrides the operator input as required to limit wheel slip, and (2) base brake mode, wherein a wheel is under operator control through the brake pedal input. The embodiment has, in addition, one inactive braking mode, in which the brakes are not activated. At any given time, different wheels of the vehicle may be in different active braking modes. For example, the operator may be controlling three of the four brake units in base brake mode while the ABS is in control of the fourth wheel, which has excessive slip due to a patch of ice.

Proceeding to step 52, the routine determines if ABS is active for the wheel. If it is not, an ABS Temp value is set equal to zero in step 54. If ABS is active, an ABS Temp value is calculated for a front wheel in step 56 as follows:

$$ABS\ Temp\ (i) = ABS1 * (ABS2 + Decel) * Decel * WS\ (i),$$

wherein ABS1 and ABS2 are positive calibration constants, Decel is the determined vehicle deceleration (positive if decelerating) and WS is wheel speed for wheel i=1,2,3,4. Likewise, also in step 56, an ABS Temp value is calculated for a rear wheel as follows:

$$ABS\ Temp\ (i) = ABS3 * (ABS4 - Decel) * Decel * WS\ (i),$$

wherein ABS3 and ABS4 are additional positive calibrated constants. In addition, ABS4 is chosen so that the difference (ABS4−Decel) will be positive for any realizable value of Decel. These equations provide a contribution to brake rotor temperature increase that is compensated for load shift from rear to front wheels during vehicle braking. The load shift causes the front wheels to do more of the braking work and thus generate more heat. The amount increases with deceleration; and thus the value of deceleration is added to constant ABS2 for the front wheel but is subtracted from constant ABS4 for the rear wheel. For each wheel, the intermediate value obtained is multiplied times identical other factors: a scaling constant (ABS1 or ABS3), vehicle deceleration and wheel speed. The presentation as separate equations with all positive calibrated constants is for ease of reading and understanding. The same result may be accomplished more efficiently with a single equation as in the first equation above (i.e. using the sum: ABS2+Decel) with different sets of values for ABS1 and ABS2 for the front and rear wheels. The set of constant values for the front wheels will be positive; but the set of constant values for the rear wheels will be negative in order to produce the difference (ABS2−Decel).

From step 54 or step 56 the routine proceeds to step 58, wherein it is determined if the Base Brake mode is active for the wheel. This mode is active for a wheel when the operator is applying the brakes and the operator chosen braking force is not overruled by another braking mode such as ABS at the wheel. If the Base Brake mode is not active, a value Base Temp is set equal to zero at step 60. But if the Base Brake mode is active, a value of Base Temp is calculated at step 62.

The calculation of Base Temp is similar to that of ABS Temp. For the front wheel:

$$Base\ Temp\ (i) = Base1 * (Base2 + Decel) * Decel * WS\ (i),$$

wherein Base1 and Base2 are positive calibration constants, Decel is the determined vehicle deceleration (positive if decelerating) and WS is wheel speed for wheel i=1,2,3,4. Likewise, also in step 56, Base Temp is calculated for a rear wheel as follows:

$$Base\ Temp\ (i) = Base3 * (Base4 - Decel) * Decel * WS\ (i),$$

wherein Base3 and Base4 are additional positive calibrated constants. In addition, Base4 is chosen so that the difference (Base4−Decel) will be positive for any realizable value of Decel. As with the similar equations for ABS Temp, these equations provide a contribution to brake rotor temperature increase that is compensated for load shift from rear to front wheels during vehicle braking; and a similar result may be accomplished more efficiently with a single equation in the same manner.

From step 60 or step 62, the routine proceeds to step 64, wherein a value for the cooling effect of air on the rotor is calculated. A value of Cool Temp ($i$) is derived for each wheel by the following equation:

$$Cool\ Temp\ (i) = (Cool1 + Cool2 * WS\ (i)) * (Rotor\ Temp\ (i) - Amb\ Temp),$$

wherein Cool1 and Cool2 are calibrated constants, Rotor Temp ($i$) is the most recent value of the estimated rotor temperature and Amb is the ambient temperature as reported by sensor 18. The cooling effect is essentially proportional to the wheel speed and to the difference between the rotor temperature and ambient temperature.

From step 64, the routine proceeds to step 66, wherein the value of estimated rotor temperature is updated according to the following equation:

$$Rotor\ Temp\ (i) = Rotor\ Temp\ (i) + ABS\ Temp\ (i) + Base\ Temp\ (i) - Cool\ Temp\ (i).$$

This is an updating equation in which the new value of Rotor Temp, for each wheel, is the sum of the previous value of Rotor Temp with updating factors for ABS Temp, Base Temp and Cool Temp. For a given wheel at any time, if the braking mode is inactive (no braking), the first two of these factors will be zero; otherwise, there will be a non-zero value for the braking mode that is active and a zero value for the one that is not active. It is not anticipated that ABS Temp and Base Temp will both be non-zero, since by definition the ABS mode and the Base Brake mode are mutually exclusive. But the cooling effect is always present when the brake temperature is greater than ambient and wheel speed is greater than zero.

In addition, the equation given above for Rotor Temp ($i$) may be expanded to include other braking modes, including traction control, vehicle stability control, etc. This is done most simply by the addition of a new term in the equation for each additional, mutually exclusive braking mode and additional code for determining the value of the term based on the main factors producing brake rotor heat in that braking mode and some calibrated constants.

The routine is repeated recursively on a specified time basis so that the estimated brake rotor temperature Rotor Temp will closely approximate the changing actual brake rotor temperature for each wheel. The recursive process may be begun when vehicle operation is initiated by setting the estimated rotor temperature Rotor Temp equal to the ambient temperature Amb Temp.

Some vehicles may be provided with brake pressure sensing capability: either a single pressure sensor of master cylinder pressure or separate pressure sensors for the individual brake units 14. In the case of individual brake units, a brake pressure signal from such a sensor would preferably replace the use of vehicle deceleration in the Base Brake mode and the ABS mode. If a single, master cylinder based pressure sensor is used, it would preferably replace the use of vehicle deceleration in the Base Brake mode but could not replace it in the ABS mode. Moreover, for those braking modes wherein brake pressure signals indicate the actual brake pressure in front and rear brake units, there is no need to compensate for load shift in braking. But the cooling effect would still be required at all times, whether a braking mode is active or not.

What is claimed is:

1. A method for estimating rotor temperatures of a front brake unit adapted for use with a front vehicle wheel and a rear brake unit adapted for use with a rear vehicle wheel, each of the front and rear brake units having an activated mode and a deactivated mode, the method comprising the steps:

providing an initial estimated rotor temperature for each of the front and rear brake units;

sensing an ambient temperature;

determining a vehicle deceleration;

sensing a wheel speed for each of the front and rear brake units;

deriving a cooling temperature decrease value for each of the front and rear brake units based on the sensed wheel speed and the difference between the first estimated rotor temperature and the ambient temperature;

responsive to the brake deactivated mode, updating the estimated rotor temperature of each of the front and rear brake units based on the cooling temperature decrease value;

responsive to the brake activated mode, deriving a braking temperature increase value for each of the front and rear brake units based at least on the associated sensed wheel speed and the determined vehicle deceleration and updating the estimated rotor temperature based on a sum of the cooling temperature decrease value and the braking temperature increase value, the braking temperature increase value for the front brake unit exceeding the braking temperature increase value for the rear brake unit based on the determined vehicle deceleration to compensate for vehicle load shift during braking; and recursively repeating the previous steps using the most recent value of the estimated rotor temperature as the initial estimated rotor temperature for each brake unit.

2. The method of claim 1 wherein the value of the braking temperature increase for a front wheel is proportional to the vehicle deceleration, the wheel speed and the sum of a first predetermined constant and the vehicle deceleration and the value of the braking temperature for a rear wheel is proportional to the vehicle deceleration, the wheel speed and the difference of a second predetermined constant and the vehicle deceleration.

3. Apparatus for estimating rotor temperatures of a front brake unit adapted for use with a front vehicle wheel and a rear brake unit adapted for use with a rear vehicle wheel, each of the front and rear brake units having an activated mode and a deactivated mode, the apparatus comprising, in combination:

providing an initial estimated rotor temperature for each of the front and rear brake units;

a wheel speed sensor associated with each of the front and rear brake units; and a digital computer having:
   (a) means for determining a vehicle deceleration;
   (b) means for deriving a cooling temperature decrease value for each of the front and rear brake units based on the sensed wheel speed and the difference between the first estimated rotor temperature and the ambient temperature;
   (c) means responsive to the brake deactivated mode for updating the estimated rotor temperature of each of the front and rear brake units based on the cooling temperature decrease value;
   (d) means responsive to the brake activated mode for deriving a braking temperature increase value for each of the front and rear brake units based at least on the associated sensed wheel speed and the determined vehicle deceleration and updating the estimated rotor temperature based on a sum of the cooling temperature decrease value and the braking temperature increase value, the braking temperature increase value for the front brake unit exceeding the braking temperature increase value for the rear brake unit based on the determined vehicle deceleration to compensate for vehicle load shift during braking; and
   (e) means for recursively repeating the previous steps using the most recent value of the estimated rotor temperature as the initial estimated rotor temperature for each brake unit.

4. The apparatus of claim 3 wherein the value of the braking temperature increase for a front wheel is proportional to the vehicle deceleration, the wheel speed and the sum of a first predetermined constant and the vehicle deceleration and the value of the braking temperature for a rear wheel is proportional to the vehicle deceleration, the wheel speed and the difference of a second predetermined constant and the vehicle deceleration.

* * * * *